Figure 1:
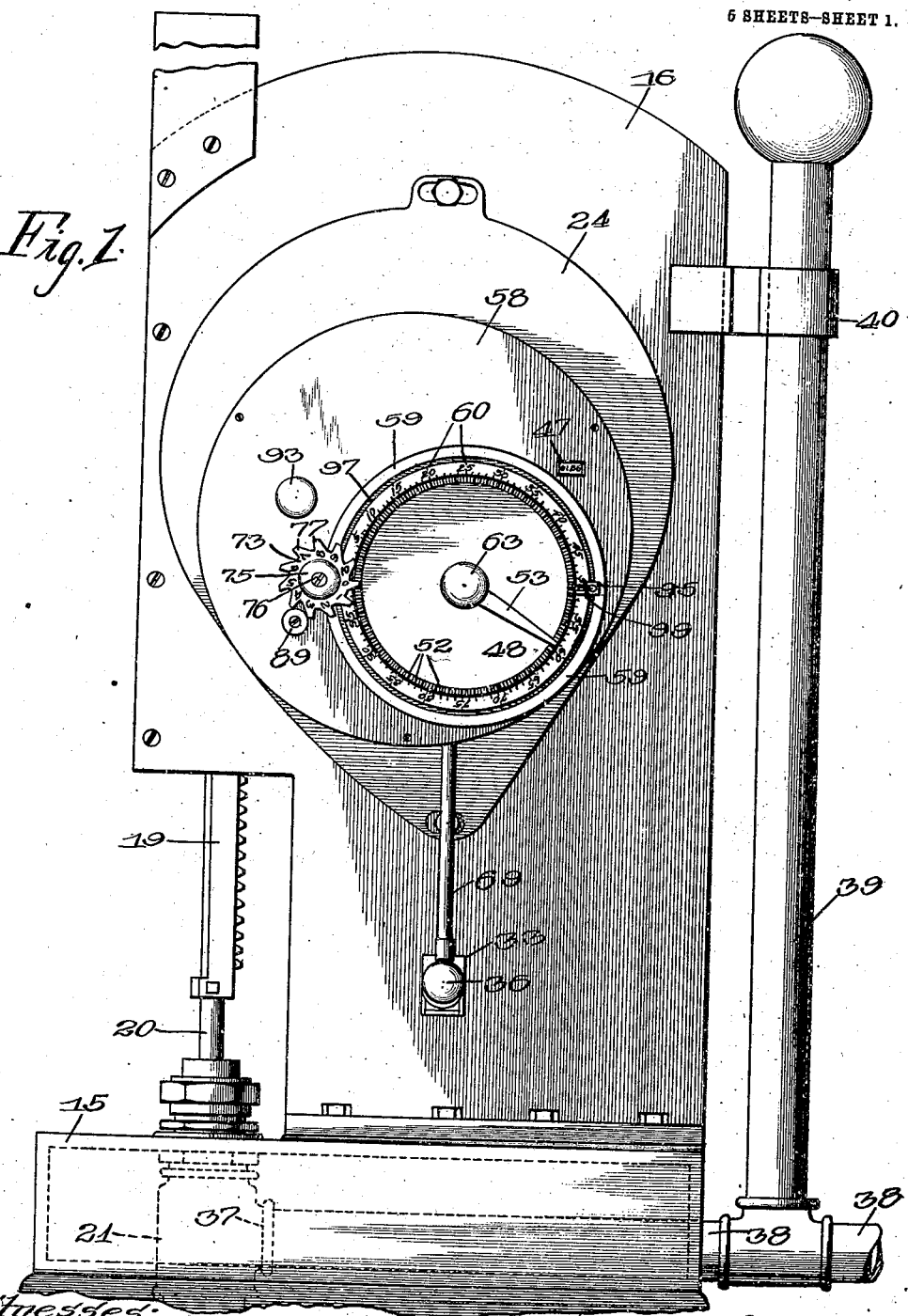

A. A. BOWSER.
MEASURING PUMP.
APPLICATION FILED MAR. 11, 1908.

1,046,053.

Patented Dec. 3, 1912.
5 SHEETS—SHEET 1.

Witnesses:

Inventor:
Allen A. Bowser

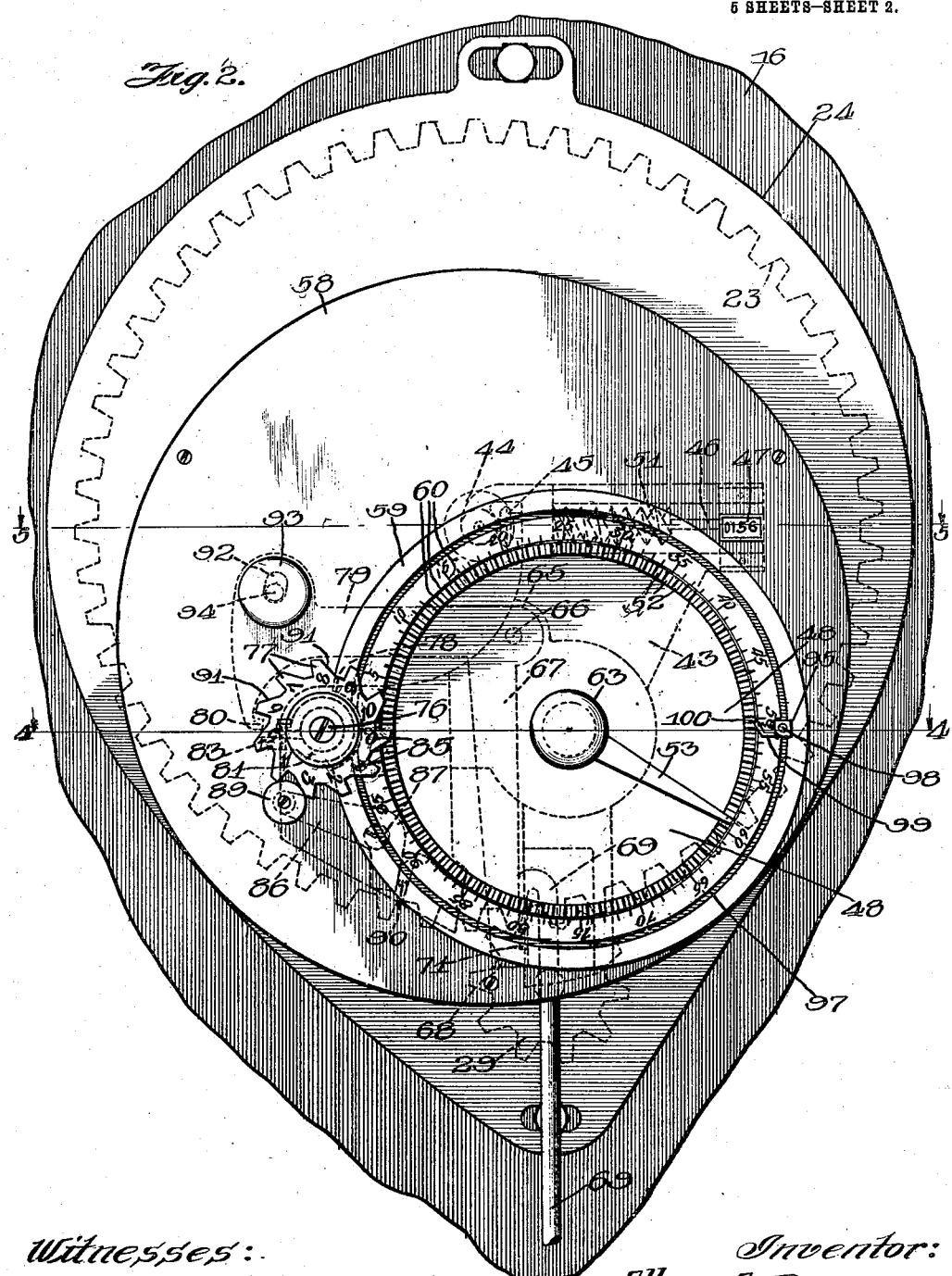

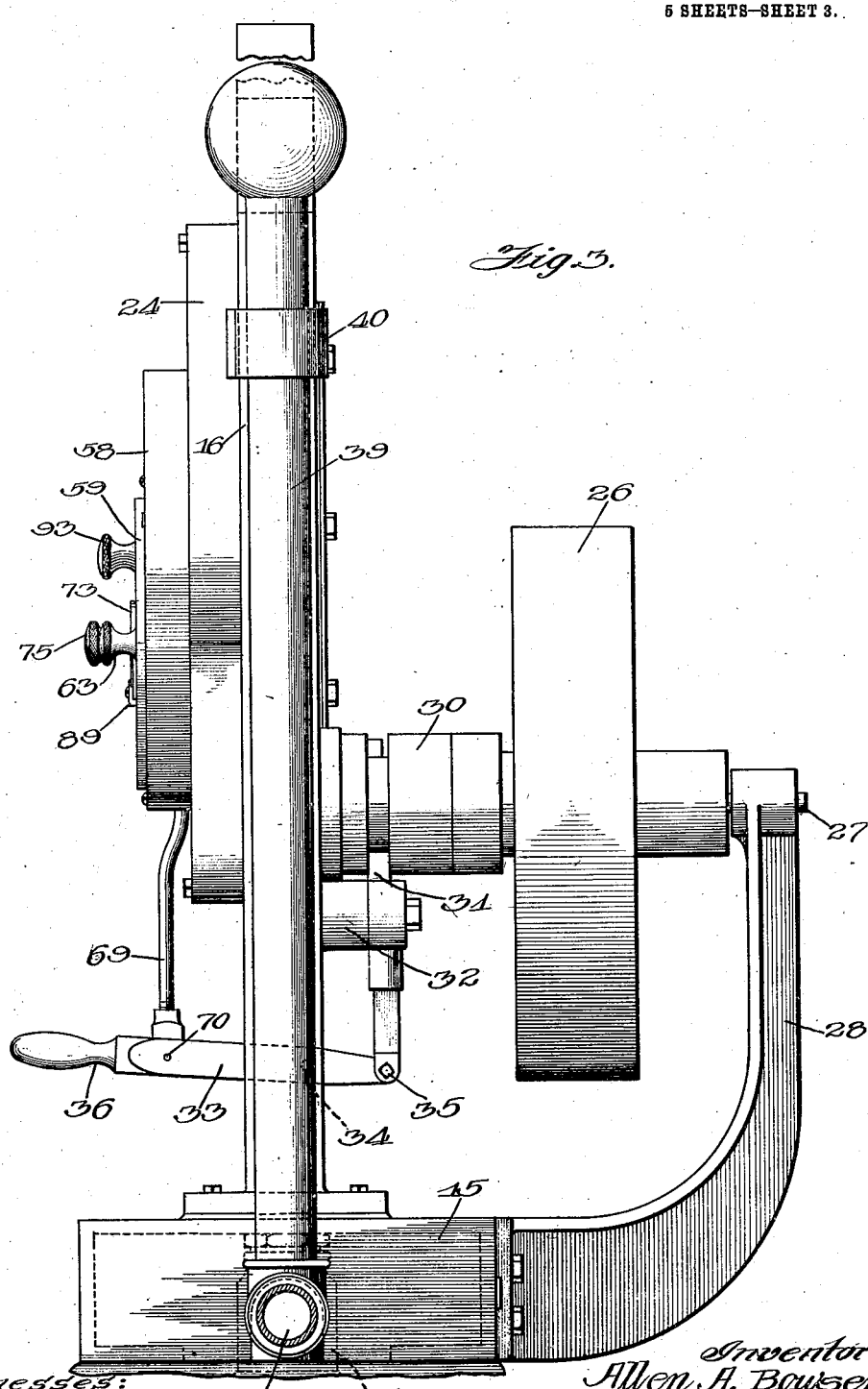

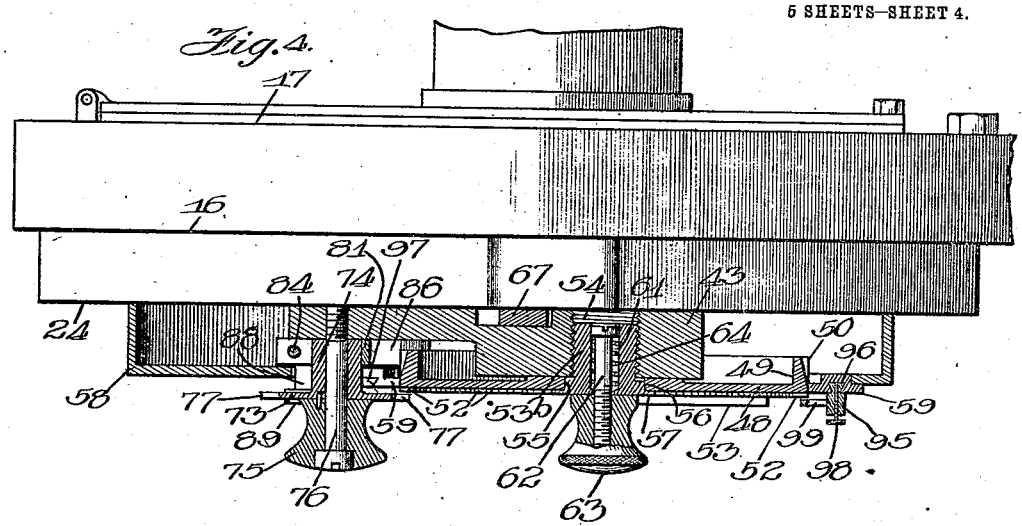
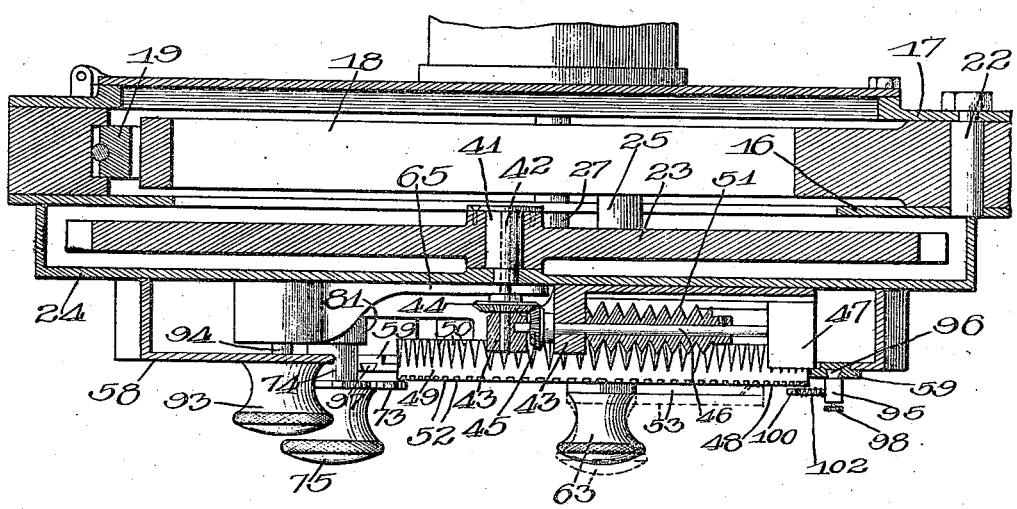

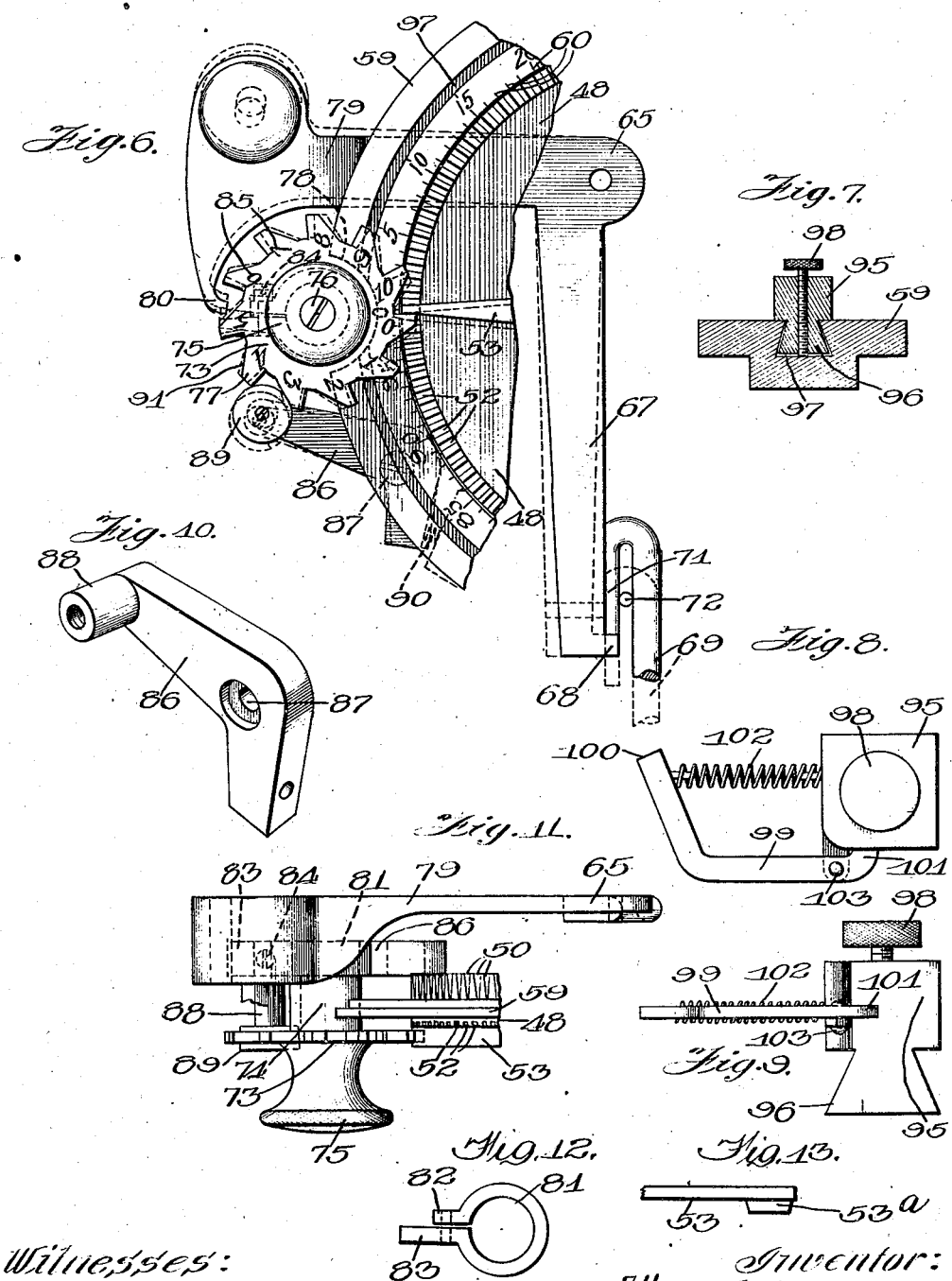

UNITED STATES PATENT OFFICE.

ALLEN A. BOWSER, OF FORT WAYNE, INDIANA, ASSIGNOR TO S. F. BOWSER & COMPANY, INCORPORATED, OF FORT WAYNE, INDIANA, A CORPORATION OF INDIANA.

MEASURING-PUMP.

1,046,053.  Specification of Letters Patent.  Patented Dec. 3, 1912.

Application filed March 11, 1908. Serial No. 420,439.

*To all whom it may concern:*

Be it known that I, ALLEN A. BOWSER, a citizen of the United States, residing at Fort Wayne, county of Allen, and State of Indiana, have invented certain new and useful Improvements in Measuring-Pumps, of which the following is a specification.

This invention relates to improvements in measuring pumps and the primary object of the same is to provide an improved device of this character adapted to pump or measure a predetermined quantity of liquid within certain limits, and improved means for increasing the number of strokes or limit of the pump.

A further object is to provide improved means for automatically checking or stopping the pump when the desired amount has been pumped.

A further object is to provide an improved device of this character including an improved indicator dial adapted to be set so that the pump will discharge a predetermined amount of liquid, and an improved adjustable stop for limiting the setting movement of the dial whereby the dial may be readily reset to permit the pump to discharge the same quantity after the first quantity has been pumped.

A further object is to provide an improved supplemental dial or ratchet mechanism for increasing the number of strokes or limit of the pump.

A further object is to provide improved tripping mechanism for rendering the operating mechanism inactive.

A further object is to provide an improved device of this character which will be simple and durable in construction and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating an embodiment of the invention and in which—

Figure 1 is a detail front elevation of an improved device of this character constructed in accordance with the principles of this invention. Fig. 2 is an enlarged detail elevation of the dial and tripping mechanism. Fig. 3 is a side elevation of Fig. 1. Fig. 4 is a detail sectional view on line 4—4 of Fig. 2. Fig. 5 is a detail sectional view on line 5—5 of Fig. 2 with parts broken away. Fig. 6 is an enlarged detail elevation of the tripping mechanism and the supplemental dial or ratchet for increasing the number of strokes or limit of the pump. Fig. 7 is a detail sectional view of the adjustable stop for the dial. Fig. 8 is a top plan view of the stop. Fig. 9 is an elevation of Fig. 8. Fig. 10 is a perspective view of the retaining pawl for the supplemental dial or ratchet. Fig. 11 is a top plan view of Fig. 6. Fig. 12 is a detail view of the sleeve or collar for tripping the releasing member. Fig. 13 is a detail view of the extremity of the indicator arm.

Referring more particularly to the drawings and in the present exemplification of the invention, the numeral 15 designates a portion of a suitable supporting frame or base upon which is mounted spaced walls 16, 17, forming a casing for the segment 18, the teeth of which engage a suitable rack 19 which is operatively connected to the piston rod 20 of the pump 21, a portion of which latter is shown in Fig. 1 of the drawings, so that when the segment 18 is oscillated about its point of pivotal support 22 the piston operating rack 19 will be raised and lowered.

Motion may be imparted to the segment 18 preferably by means of a gear 23 which is journaled to a suitable casing 24, which latter is supported by the front face of the wall 16 of the segment casing, and a suitable operative connection 25 is arranged between the gear 23 and the segment 18.

Motion may be transmitted to the gear 23 preferably by means of a pulley 26 mounted upon a shaft 27, one end of which latter may be supported by the spaced walls 16 and 17 and the other end by a suitable bracket 28. One end of the shaft 27 extends through the segment casing and secured for rotation with this shaft is a pinion wheel 29 which meshes with the gear 23 (as shown more clearly in Fig. 2 of the drawings) so that when motion is transmitted to the shaft 27 the pinion 29 will rotate the gear 23.

A suitable clutch mechanism 30 is arranged to control the rotation of the gear 23 and an operating member 31 serves to lock or unlock the pulley 26 with respect to the shaft 27. The locking member 31 is adapted to move upon a suitable support 32 and is controlled by a lever 33 which is fulcrumed intermediate its ends as at 34 (shown more clearly in Fig. 3 of the drawings) and one extremity thereof is pivotally connected to the member 31 as at 35. The other extremity of the lever preferably projects beyond the front of the segment casing and is provided with a weighted handle 36, which latter is adapted to normally hold the member 31 in a position to release the pulley 26 with relation to the shaft 27.

The specific construction of the clutch mechanism and the member 26 forms no part of the present invention but forms a portion of the subject matter of application Serial No. 357,125, filed February 13, 1907.

Connected to the discharge outlet 37 of the pump cylinder 21 (see Fig. 1) is a discharge pipe 38 and communicating with this pipe 38 at a point remote from its discharge end is a pressure chamber 39 preferably in the form of a pipe which extends above pipe 38 and may be held in position in any desired or suitable manner, preferably by means of a bracket 40 secured to the casing at a point adjacent the end of the pipe 39. When the piston rod 20 is operated, a portion of the liquid discharged from the pump cylinder 21 will enter the chamber 39 to compress the air therein so that the liquid will be forced out of the discharge opening of the pipe 38 as the piston returns.

The gear 23 is rotatably supported by the gear case 24 by means of the axle 41, which is journaled in said case, and passing through the axle 41 is a supplemental axle 42 which is secured for rotation with the axle 41, and the forward extremity thereof projects beyond the front of the gear case 24 and is journaled in a suitable casting 43, which latter may be secured in any desired or suitable manner to the front of the gear case 24. A gear wheel 44 is secured to the shaft 42 for rotation therewith and said gear wheel meshes with a suitable gear wheel 45, secured to the shaft 46 of the cyclometer 47, which latter may be of any ordinary or well known construction and is adapted to be operated by the gear 23 through the medium of the beveled gear wheels 44, 45.

A disk 48 is rotatably supported by the casting 43 and is located preferably beyond the journal of the axle 41 of the gear 23 and this disk is preferably provided with a peripheral flange 49 which is provided with worm teeth 50 adjacent the rear edge thereof, and mounted for rotation with the cyclometer shaft 46 is a worm screw or gear 51 which meshes with the worm teeth 50 (see Figs. 2 and 5) so that when the gear 23 is rotated the worm 51 will impart a rotary motion to the disk 48 and the worm gearing thus formed is so proportioned that one step of rotation will be imparted to the disk 48 upon each complete rotation of the gear 23.

The disk 48 is also provided with a series of notches 52 and an arm 53 is provided with a depending portion 53ᵃ adjacent one extremity thereof adapted to be seated within these notches.

Any suitable means may be provided for mounting the disk 48 for rotation and a suitable and efficient means for accomplishing this purpose comprises a hub 53ᵇ, one extremity of which is provided with peripheral screw threads adapted to engage corresponding threads in an aperture 54 of the casting 43. The other extremity of the hub is provided with a shoulder 55 which is adapted to enter a suitable aperture 56 in the disk 48 and a flange 57 is adapted to engage the face of the disk to prevent displacement of the latter. The shoulder 55 and the aperture 56 are of diameters greater than the diameter of the aperture 54 in the casting 43 so that when the extremity of the hub is secured into the casting, the shoulder 55 will project over the face of the casting to prevent the flange 57 from binding the disk, which would hold the latter against free rotation.

A casing 58 is supported by the gear casing 24 to cover the casting 43 and this casing 58 is provided with a suitable aperture or opening through which the face of the disk 48 is exposed. A ring or plate 59 is secured to the casing 58 and surrounds the aperture therein and is of a diameter slightly larger than the diameter of the disk, so that one edge of the ring will stand in close proximity to the periphery of the disk. This ring 59 is provided with a series of graduations 60, one of which is provided for each of the notches 52 in the disk 48 and the graduations 60 are arranged in progressive order with the zero graduation preferably located to the left hand side of the disk and at a point remote from the axle 41 of the gear 23.

The hub 53ᵇ is provided with a recess 61 (see Fig. 4) which opens through the top thereof, and located within and passing through the recess 61 is a screw or bolt 62, the head of which is located within the recess and the other extremity projects beyond the face of the disk 48. A suitable operating handle or knob 63 is secured to the free extremity of the screw or bolt 62 and supported by this handle or knob 63 is the arm 53, and this arm is of such a length that the free extremity thereof is adapted to enter any one of the notches 52 in the disk 48. A suitable resilient member 64, such as a coil spring or the like, surrounds the screw or bolt 62 within the recess 61 and is located between the head of the bolt and the bottom of the recess. This resilient member 64 tends to hold the arm 53 in engagement with the face of the disk 48 so as to hold the extremity of the arm seated within the respective notch 52. When it is desired to adjust the arm 53 with relation to the disk 48 so as to seat the extremity thereof in another one of the notches 52, the resilient member 64 may be placed under tension, that is, the handle or knob 63 may be drawn outwardly away from the face of the disk 48 which will at the same time raise the arm 53 and when in this position the arm 53 may be rotated about the face of the dial by turning the knob or handle upon the bolt or screw 62 as an axle until the extremity of the arm 53 has been placed in position above the desired notch 52 and when in this position the extremity of the arm will be seated in the respective notch by the expansion of the resilient member 64 when the knob or handle 63 is released.

A releasing member designated generally by the reference numeral 65 and preferably in the form of a bell crank lever is pivotally supported as at 66 (see Fig. 2) intermediate its extremities to the casting 43 to the rear of the disk 48. One of the arms 67 of the releasing member is provided with a shoulder or offset portion 68 adjacent the free extremity thereof. A rod or bar 69 is pivotally connected by one extremity as at 70 to the weighted extremity of the lever 33 (see Fig. 3). The free end of this bar or rod is adapted to project through a suitable opening in the casing 58 and is bent back upon itself as at 71 to form a U-shaped extremity (see Fig. 6) and the extremity of the portion 71 thereof is adapted to engage and rest upon the shoulder or projection 68 of the arm 67 of the releasing member 65 so as to raise the weighted end of the lever 33 and lower the member 31 to release the clutch mechanism 30 so that motion may be imparted from the shaft 27 to set the pump into operation. If desired, a suitable guide pin 72 may be provided which extends through the space formed between the body of the bar or rod 69 and its extremity 71 to guide the said extremity and to hold it against displacement.

When it is desired to pump a specified quantity of liquid, the arm 53 is adjusted from its zero position, in the manner already set forth until its extremity is above the notch adjacent the desired quantity indicated by the graduations 60 and which in the exemplification shown in Fig. 2 of the drawings is sixty gallons. During the adjustment of the arm 53 the disk 48 will be held against rotary motion by means of the worm gearing 50, 51. After the pump has been thus set the mechanism may be thrown into operation by raising the lever 33 by means of handle 36, which movement will raise the extremity 71 of the bar or rod 69 to a position to permit the shoulder or offset portion 68 on the arm 67 of the releasing member 65 to assume a position (by means of gravity) within the path of the return movement of the extremity of the bar or rod and when the handle 36 is released the extremity will engage and rest upon the shoulder or projection 68. During the operation of the pump the disk 48 will be given one step of rotation for each complete rotation of the cyclometer shaft 46 and such rotation will be continued until the disk 48 has moved to such a position as to bring the extremity of the arm 53, which is locked thereto, to the zero position or to the zero graduation on the plate 59.

In order to prevent further operation of the mechanism when the arm and disk have reached the zero position, suitable mechanism must be provided for throwing the pump out of operation. In order to accomplish this result suitable means will now be described for rocking the arm 67 of the release mechanism 65 about its point of pivotal support 66 to move the projection or shoulder 68 away from the extremity 71 of the bar or rod 69, which will permit the bar 69 to be lowered by means of the weighted arm 36, which movement will shift the member 31 to unlock the clutch mechanism 30. Any suitable means may be provided for this purpose but a simple and efficient mechanism will now be described.

A supplemental dial or ratchet 73 is provided with a hub 74 and an operating knob or handle 75 through which a suitable screw or bolt 76 is adapted to pass and by means of which latter the supplemental dial or indicator may be rotatably supported or secured to the casting 43. This supplemental dial or indicator is located adjacent the zero graduation of the plate 59 and is provided with any desired number of peripheral teeth 77 which extend over the plate 59 and the notches 52 in the face of the disk and within the path of movement of the extremity of the arm 53, the hub 74 being of such a length to permit the teeth to assume such a position and the ring 59 is preferably cut away as at 78 (see Fig. 6) to permit the teeth 77 to assume such a position without materially increasing the diameter of the supplemental dial or ratchet. The other arm 79 of the releasing member 65 is adapted to project over the hub 74 and is provided with a depending hook-shaped portion 80, which is adapted to stand behind the supplemental dial or indicator 73 (see Fig. 6) and in close proximity to the hub 74 thereof.

A split sleeve or holder 81 surrounds the hub 74 and is provided with projecting ears 82, 83, one of which, preferably the ear 83, is somewhat longer than the other ear and this sleeve or collar 81 is adapted to be frictionally secured to the hub 74 preferably by means of a screw or bolt 84 which passes through the ears 82 and 83 to draw the latter together and cause the sleeve to grip the hub. The sleeve is so arranged with respect to the hook-shaped portion 80 of the arm 79 of the releasing member 65 that when the extremity 71 of the bar or rod 69 rests upon the shoulder or projection 68 of the arm 67 of the releasing member, the hook-shaped extremity 80 of the arm 79 will stand within the path of movement of the ear 83 of the sleeve 81 so that when the supplemental dial or indicator 73 is rotated to move the ear 83 toward the extremity 80 of the arm 79 the ear will engage said extremity and tend to raise the same, thereby rocking the releasing member 65 about its point of pivotal support 66, to move the shoulder or projection 68 on the arm 67 thereof away from the extremity 71 of the bar or rod 69 to release the latter. Each of the teeth 77 of the supplemental dial or indicator is provided with a graduation 85 and these graduations are arranged in progressive order, in a clockwise direction.

The sleeve 81 is secured to the hub 74 in such a position that the ear 83 thereof will be diametrically opposite the zero graduation 85 on the supplemental dial or indicator, that is, when the notch in which the extremity of the arm 53 is seated is opposite the zero graduation 60 of the plate 59, the ear 83 will engage extremity 80 and move the releasing member in the manner just described.

A locking pawl 86 (shown more clearly in Figs. 6 and 10 of the drawings) is pivotally supported as at 87 to the casting 43 and is provided with a bearing 88 which extends through the casing 58, and rotatably mounted upon the bearing 88 is an anti-friction roller 89 which is adapted to engage between two of the teeth 77 of the supplemental dial or indicator 73, which latter is also located in front of the face of the casing 58. A suitable yielding member 90, such as a coil spring or the like, is provided to engage the dog 86 on one side of its pivot and any suitable stationary portion of the mechanism, such as the casting 43, and which tends to hold the anti-friction roller 89 in engagement with the adjacent teeth of the supplemental dial or indicator. This anti-friction roller 89 is so arranged and the teeth 77 of the supplemental dial or indicator are so disposed that when the arm 53 is out of engagement with one of the teeth, the zero tooth will assume a position directly over the zero graduation on the plate 59, as shown more clearly in Figs. 2 and 6 of the drawings, so that it will be necessary to impart a partial rotation to the supplemental dial or indicator to uncover the zero graduation to permit the extremity of the arm 53 to register with the zero graduation in order to throw the mechanism out of operation. This arrangement is provided in order that the ear 83 of the collar 81 will normally stand out of engagement with the extremity 80 of the releasing member 65 so as to permit the releasing member to assume a proper position to lock the mechanism for operation and to permit the proper movement of the releasing member for this operation but when the extremity of the arm 53 advances to the zero indication on the plate 59, it will engage the tooth 77 of the supplemental dial or indicator which projects over the zero indication just before the final step of rotation of the disk 48 and the final step of rotation of the disk 48 will cause the extremity of the arm 53 to rotate the supplemental dial or indicator against the tension of the retaining anti-friction roller 89 as the extremity of the arm 53 moves to the zero position. The teeth 77 of the supplemental dial or indicator are preferably provided with inclined faces 91 which are disposed at such an inclination that this partial rotation of the supplemental dial or indicator will not unseat the anti-friction roller 89 but will only move the anti-friction roller a sufficient distance to rock the retaining dog 86 on its pivot 87 a short distance to permit this necessary limited movement of the supplemental dial or indicator.

When it is desired to increase the number of strokes or limit of the pump, that is, increase the number of strokes or limit beyond the number of strokes or limit indicated by the graduation on the plate 59, which in the present exemplification of the invention is a hundred gallons, all that is necessary after the arm 53 has been properly adjusted is to impart an axial rotation to the supplemental dial or indicator by means of the knob or handle 75 so as to bring the tooth 77 thereof, which contains the desired quantity to a position directly over the zero graduation of the plate 59. If it is desired to increase the number of strokes or limit from the number necessary to discharge one hundred gallons to a number necessary to discharge two hundred gallons, all that is necessary is to rotate the supplemental dial or indicator so that the numeral 1 thereon assumes a position over the zero graduation and likewise for any number of gallons. If the numeral 1 is over the zero graduation on the plate 59 it will be apparent that one complete rotation of the disk 48 will cause the extremity of the arm 53 to move the supplemental dial or ratchet one step of rotation, which step will cause the zero graduation thereon to assume a position over the zero graduation on the plate 59 if the machine is set for two hundred gallons, and this step of rotation will not throw the mechanism out of operation as the ear or projection 83 on the collar 81 only moves one step nearer the hook-shaped extremity 80 of the releasing member 65. The disk 48 upon its next complete rotation will cause the extremity of the arm 53 to engage the tooth 77 of the supplemental dial or ratchet containing the zero graduation, which has assumed a position over the zero graduation on the plate 59, and this second step of rotation of the supplemental dial or ratchet will throw the mechanism out of operation in the manner already set forth.

The casing 58 may be provided with a slot 92 (see Fig. 2), and a handle or knob 93 may be connected to the releasing member 65 by means of a connecting portion or member 94 which extends through the slot 92 and this knob or handle 93 is located on the outside of the casing 58 and serves as a means whereby the releasing member 65 may be tripped when desired, to throw the mechanism out of operation before the arm 53 reaches the zero position.

When it is desired to pump a quantity of liquid less than a hundred gallons, the arm 53 is set and locked to the disk 48 in the manner already indicated and when the arm is moved out of the zero position the supplemental dial or ratchet will be moved by the tension of the spring 90 on retaining dog 86 so that the zero tooth will cover the zero graduation on the plate 59. Should it be desired to pump another quantity equal to the amount just pumped, it would be necessary to re-set the arm 53 in the same manner. In order to permit the arm to be readily re-set to pump the same quantity, and to dispense with the necessity of a careful observation and manipulation of the arm, a suitable stop 95 may be provided. This stop is preferably provided with a dove-tailed base 96 adapted to move within a correspondingly shaped groove 97 in the plate 59 and the dove-tailed base 96 may be inserted or placed within the groove at the place 78 where the plate 59 is cut away and when inserted the stop may be moved to any desired position about the plate 59. A suitable screw 98 is provided which extends through the body of the stop 95 and the base 96 so as to impinge the bottom of the groove 97 to bind or lock the stop in any desired position. Pivotally supported by the stop is an arm 99, the extremity 100 of which is adapted to project over the grooves or notches 52 in the disk 48 so as to stand within the path of movement of the extremity of the arm 53 when the latter is moved in one direction. The other extremity 101 of the arm is adapted to engage the body of the stop 95 so as to prevent the arm from rocking in one direction, and a yielding member 102, such as a coil spring or the like, is arranged between the stop 95 and the arm 99 beyond its pivot for normally holding the extremity 100 in position.

The stop 95 is adapted to be adjusted so that the extremity 100 will stand over the stop or notch opposite the graduation denoting the desired amount of liquid and when it is secured in position by means of the screw 98, it will be apparent that when the arm 53 is rotated from the zero position or from the position shown in Fig. 6 to the right, it will engage the extremity 100 of the arm 99, which latter will prevent a further movement of the arm 53 in the same direction. When the arm is thus adjusted and the machine is set into operation, the arm will move away from the stop and toward the zero position. When it is desired to pump the same quantity the arm 53 is unlocked from the disk 48 and moved away from the zero position and toward the stop until it engages the extremity 100, thereby obviating the necessity of a careful manipulation of the arm. When the arm is moved in the opposite direction or from the position shown in Figs. 1 and 2 toward the stop, the extremity thereof will engage the arm 99 and rock the latter about its point of pivotal support 103 and against the tension of the yielding member 102, which will permit the extremity of the arm to pass the arm 99.

In order that the invention might be fully understood the details of an embodiment thereof have been specifically described, but

What I claim as new and desire to secure by Letters Patent is—

1. In combination, in a measuring pump, an indicator, a disk, coöperating with the indicator, means also coöperating with the indicator for indicating a predetermined amount within a certain limit, operating mechanism including means for moving the disk to move the said indicator from the indicated position, means for extending the said limit of the pump, and means coöperating with the last said means for automatically rendering the operating mechanism inactive when the predetermined quantity has been discharged.

2. In combination, in a measuring pump, an indicator, a disk coöperating with the indicator, means also coöperating with the indicator for indicating a predetermined amount within a certain limit, operating mechanism including means for moving the disk to move the said indicator from the indicated position, means for extending the said limit of the pump, and means operatively related to the last said means for automatically rendering the operating mechanism inactive when the predetermined quantity has been discharged.

3. In combination in a measuring pump, an indicator, a disk coöperating with the indicator, means also coöperating with the indicator for indicating a predetermined amount within a certain limit, operating mechanism including means for moving the disk to move the said indicator from its indicated position, a releasing member for rendering the operating mechanism inactive, means for extending the limit of the pump, and means operatively related to the last said means and adapted to shift the releasing member.

4. In combination in a measuring pump, an indicator, a disk coöperating with the indicator, means also coöperating with the indicator for indicating a predetermined amount within a certain limit, operating mechanism including means for moving the disk to move the said indicator from the indicated position, a dial for extending the said limit, said indicator also operating to move the dial when the former is moved by the disk, and means operatively related to the dial for rendering the said operating means inactive.

5. In combination in a measuring pump, an indicator, a disk coöperating with the indicator, means also coöperating with the indicator for indicating a predetermined amount within a certain limit, operating mechanism including means for moving the disk to move the first said means from the indicated position, a dial, means whereby the said dial may be adjusted to extend the said limit, yielding means for locking the dial in its adjusted position, said indicating means embodying means whereby the dial may be moved from its adjusted position by the movement of the disk, and means operatively related to the dial for automatically rendering the operating mechanism inactive when the predetermined amount has been pumped.

6. In combination in a measuring pump, an indicator, a disk coöperating with the indicator, means also coöperating with the indicator for indicating a predetermined amount within a certain limit, operating mechanism including means for moving the disk to move the said indicator from the indicated position, a dial, means whereby said dial may be adjusted to extend the said limit, means for rendering the operating mechanism inactive, said means including a gravity releasing member, said indicating means embodying means whereby the dial may be moved by the movement of the disk, and means operatively related to the dial and adapted to engage the said gravity member.

7. In combination in a measuring pump, an indicator, a disk coöperating with the indicator, means also coöperating with the indicator for indicating a predetermined quantity within a certain limit, operating mechanism including means for moving the disk to move the said indicator from the indicated position, means for extending the said limit of the pump, means coöperating with the last said means for automatically rendering the operating mechanism inactive when the predetermined quantity has been discharged, and means for registering the total amount of discharge of the pump.

8. In combination in a measuring pump, a movable element, an indicator coöperating with said element, a member movable independently of said element, means for causing said member to move with said element, said member also coöperating with the indicator and being adapted to be adjusted with respect thereto to indicate a predetermined amount within a certain limit, operating mechanism for moving the said element and the said member from the adjusted position, means for extending the said limit, said means being adapted to be shifted by the said member as the latter is moved, and means controlled by the last said means for rendering the operating mechanism inactive.

9. In combination in a measuring pump, a movable element, an indicator coöperating with said element, a member movable independently of said element, means for causing said member to move with said element, said member also coöperating with the indicator and being adapted to be adjusted with respect thereto to indicate a predetermined amount within a certain limit, a stop adjustable with respect to the indicator for limiting the movement of the said member in one direction, operating mechanism for moving the said element and member from the adjusted position, means for extending the said limit, said means being adapted to be shifted by the said member as the latter is moved, and means controlled by the last said means for rendering the operating mechanism inactive.

10. In combination in a measuring pump, a movable element, an indicator coöperating with said element, a member movable independently of said element, means for causing said member to move with said element, said member also coöperating with the indicator and being adapted to be adjusted with respect thereto to indicate a predetermined amount within a certain limit, a stop adjustable with respect to the indicator for limiting the movement of said member in one direction and adapted to permit a free movement of the member in the opposite direction, means for securing the stop in adjusted position, operating mechanism for moving the said element and member from the adjusted position, means for extending the said limit, said means being adapted to be shifted by the said member as the latter is moved, and means controlled by the last said means for rendering the operating mechanism inactive.

11. In combination in a measuring pump, an indicator, an element adjustable with respect to the indicator to indicate a predetermined amount within a certain limit, operating mechanism for moving said element from its adjusted position, a supplemental indicator element, means whereby said supplemental element may be adjusted to extend the said limit, means operatively related to the first said element for moving the said supplemental element, means for rendering the operating mechanism inactive, said means including a releasing member, means operatively related to the said supplemental element for controlling the said releasing member, and an additional means for controlling the releasing member.

12. A measuring pump including an indicator, a disk coöperating therewith, means also coöperating with the indicator for indicating a predetermined amount within a certain limit, operating mechanism for moving the disk from the indicated position, means operatively related to the disk for extending the said limit, means operatively related to the last said means for releasing the operating mechanism when the predetermined quantity has been pumped, and means for placing the said operating mechanism in an active position.

13. A measuring pump including an indicator, a disk coöperating therewith, means also coöperating with the indicator for indicating a predetermined quantity within a certain limit, operating mechanism for moving the disk to move the said indicator from the indicated position, a dial for increasing the said limit, said dial being provided with a shoulder, and with which the first said means coöperates to move the dial, and means operatively related to the dial for rendering the said operating mechanism inactive.

14. A measuring pump including a movable element, an indicator coöperating with said element, means whereby said element may be adjusted to a predetermined position within a certain limit, a supplemental element for extending the said limit, means for adjusting the supplemental element, said supplemental element being provided with a peripheral tooth adapted to stand within the path of movement of the first said element as the latter is moved from its adjusted position, to be engaged and moved by the last recited element, operating mechanism for moving the element from its adjusted position, and means coöperating with the said supplemental element for rendering the said operating mechanism inactive.

15. A measuring pump including a movable element, an indicator coöperating with said element, means whereby said element may be adjusted to a predetermined position within a certain limit, operating mechanism for moving said element from its adjusted position, a supplemental element for extending the said limit, means whereby the supplemental element may be adjusted independently of the first said element, means for yieldingly holding the supplemental element in its adjusted position, said supplemental element being provided with spaced teeth adapted to be successively projected into the path of movement of the first said element to be engaged and moved thereby, and means operatively related to the supplemental element for rendering the operating mechanism inactive.

16. A measuring pump including a movable element, an indicator coöperating with the element and provided with a plurality of characters arranged to designate a certain limit, means whereby said element may be adjusted to any one of the characters, a supplemental element for extending the said limit, means whereby the supplemental element may be adjusted independently of the first said element, operating mechanism for returning the first said element from its adjusted position, means for compelling the movement of the supplemental element by the first said element before the latter reaches a predetermined character on its said return movement, and means controlled by the said movement of the supplemental element for rendering the said operating mechanism inactive.

17. A measuring pump including a movable element, an indicator coöperating with said element and comprising a series of characters arranged to designate a certain limit, means whereby said element may be adjusted to one of the characters, a supplemental element for extending said limit, and being provided with spaced projecting teeth, operating mechanism for returning the first said element from its adjusted position, means whereby one of the teeth of the supplemental element may be positioned to be engaged and moved by the first said element before the latter reaches a predetermined character on its return movement, and mechanism controlled by the movement of the supplemental element under the control of the first said element adapted to render the said operating mechanism inactive.

18. A measuring pump including a movable element, an indicator coöperating with said element and having a series of characters arranged to designate a certain limit, means whereby said element may be adjusted to one of the characters, a supplemental element for extending said limit and being provided with spaced projecting teeth, operating mechanism for returning the first said element from its adjusted position, means whereby one of the teeth of the supplemental element may be positioned to be engaged and moved by the first said element before the latter reaches a predetermined character on its return movement, said means comprising a member yieldingly engaging between two of the teeth of the supplemental member, and mechanism controlled by the movement of the supplemental element under the control of the first said element adapted to render the said operating mechanism inactive.

19. A measuring pump including a movable element, an indicator coöperating with said element and provided with a plurality of characters arranged to designate a certain limit, means whereby said element may be adjusted to one of the characters, a supplemental element for extending the said limit and being provided with an inclined portion, means whereby said supplemental element may be adjusted independently of the first said element, operating mechanism for returning the first said element from its adjusted position, means for holding the supplemental element in such position that the movement thereof will be compelled by the first said element before the latter reaches a predetermined character on its said return movement, said means comprising a yielding member engaging the said inclined portion of the supplemental element to cause a portion of said element to normally assume a position in advance of the said certain character, and means controlled by the movement of the supplemental element for rendering the operating mechanism inactive.

20. A measuring pump including an indicator, a disk coöperating therewith, means also coöperating with the indicator for indicating a predetermined amount within a certain limit, operating mechanism for moving the disk to move the said indicator from the indicated position, means operatively related to the disk for extending the said limit, and means operatively related to the last said means for rendering the operating mechanism inactive when the predetermined quantity has been pumped, said means including a weighted handle, and said handle serving as a means by which the mechanism may be placed in an active position.

21. In a measuring pump, the combination of pump actuating means, tripping mechanism for stopping the actuating means when a predetermined quantity has been pumped, embodying an element movable in a continuous orbit in unison with the pump actuating means, means including said actuating means for imparting such movement to said element, said tripping mechanism embodying a trip member whereby the said actuating means may be controlled when said element reaches a predetermined point in its orbit, and means whereby said element may pass said point one or more times at will before the said trip member is actuated.

22. In combination in a measuring pump, an indicator, a disk coöperating therewith, means also coöperating with the indicator for indicating a predetermined amount within a certain limit, operating mechanism including means for moving the disk to move the said indicator from the indicated position, means adapted to be set to extend the said limit of the pump, and means coöperating with the last recited means for automatically rendering the operating mechanism inactive when the predetermined quantity has been discharged.

23. In combination in a measuring pump, an indicator, a disk coöperating with the indicator, means also coöperating with the indicator for indicating a predetermined amount within a certain limit, operating mechanism including means for moving the disk to move the said indicator from an indicating position, additional means adapted to be set at will, to extend the limit of the pump independently of the first recited means, and means coöperating with the said additional means for automatically rendering the operating mechanism inactive when the predetermined quantity has been discharged.

In testimony whereof I have signed my name to this specification, in the presence of two subscribing witnesses, on this 7th day of February A. D. 1908.

ALLEN A. BOWSER.

Witnesses:
H. D. WEAVER,
J. R. MATLACK.